United States Patent
Bae

(10) Patent No.: US 9,343,928 B2
(45) Date of Patent: May 17, 2016

(54) WIRELESS POWER TRANSMITTER, WIRELESS POWER RECEIVER, AND METHOD OF WIRELESSLY RECEIVING POWER

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 701 days.

(21) Appl. No.: 13/712,596

(22) Filed: Dec. 12, 2012

(65) Prior Publication Data

US 2013/0229062 A1 Sep. 5, 2013

(30) Foreign Application Priority Data

Mar. 5, 2012 (KR) ........................ 10-2012-0022237

(51) Int. Cl.
| | |
|---|---|
| H01F 27/42 | (2006.01) |
| H02J 17/00 | (2006.01) |
| H04B 5/00 | (2006.01) |
| H02J 5/00 | (2016.01) |
| H02J 7/02 | (2016.01) |

(52) U.S. Cl.
CPC ................. *H02J 17/00* (2013.01); *H02J 5/005* (2013.01); *H02J 7/025* (2013.01); *H04B 5/0037* (2013.01); *H04B 5/0081* (2013.01)

(58) Field of Classification Search
USPC .......................................................... 307/104
See application file for complete search history.

(56) References Cited

U.S. PATENT DOCUMENTS

| | | |
|---|---|---|
| 8,310,108 B2 | 11/2012 | Inoue et al. |
| 2010/0217553 A1 | 8/2010 | Von Novak et al. |
| 2010/0291869 A1 | 11/2010 | Wilson |
| 2011/0049995 A1 | 3/2011 | Hashiguchi et al. |
| 2011/0109263 A1 | 5/2011 | Sakoda et al. |
| 2011/0199046 A1 | 8/2011 | Tsai et al. |
| 2011/0204711 A1 | 8/2011 | Norconk et al. |
| 2012/0104998 A1 | 5/2012 | Takada et al. |
| 2012/0146576 A1 | 6/2012 | Partovi |
| 2013/0057078 A1* | 3/2013 | Lee et al. ............... 307/104 |
| 2013/0062961 A1* | 3/2013 | Park et al. ............... 307/104 |
| 2013/0119781 A1 | 5/2013 | Takada et al. |
| 2013/0285604 A1* | 10/2013 | Partovi .................. 320/108 |

(Continued)

FOREIGN PATENT DOCUMENTS

| | | |
|---|---|---|
| CN | 10-2055250 A | 5/2011 |
| CN | 10-2301564 A | 12/2011 |

(Continued)

OTHER PUBLICATIONS

Office Action dated Aug. 26, 2014 in Chinese Application No. 201310015588.3.

(Continued)

*Primary Examiner* — Ronald W Leja

(74) *Attorney, Agent, or Firm* — Saliwanchik, Lloyd & Eisenschenk

(57) ABSTRACT

Disclosed are a wireless power transmitter, a wireless power receiver, and a method of wirelessly receiving power. The wireless power receiver includes a receiving unit receiving the power from the wireless power transmitter using resonance, and a rectifying unit rectifying the power received therein from the receiving unit to supply the power to a load side. The rectifying unit changes an output impedance of the wireless power receiver in order to change an input current of the wireless power transmitter.

20 Claims, 5 Drawing Sheets

(56) References Cited

U.S. PATENT DOCUMENTS

| | | | | |
|---|---|---|---|---|
| 2013/0285605 A1* | 10/2013 | Partovi | | 320/108 |
| 2013/0300204 A1* | 11/2013 | Partovi | | 307/104 |
| 2015/0207333 A1* | 7/2015 | Baarman et al. | | 307/104 |

FOREIGN PATENT DOCUMENTS

| | | |
|---|---|---|
| KR | 10-2011-0137392 A | 12/2011 |
| TW | M385858 U | 8/2010 |
| TW | 2011-12628 A | 4/2011 |
| TW | 2012-03774 A | 1/2012 |
| WO | WO-2009/063214 A1 | 5/2009 |
| WO | WO-2010/085703 A1 | 7/2010 |
| WO | WO-2011/156768 A2 | 12/2011 |
| WO | WO-2012/014485 A2 | 2/2012 |

OTHER PUBLICATIONS

Notice of Allowance dated Mar. 27, 2013 in Korean Application No. 10-2012-0022237, filed Mar. 5, 2012.

European Search Report dated Apr. 8, 2015 in European Application No. 12196755.8.

Office Action dated Jun. 24, 2014 in Taiwanese Application No. 101150515.

* cited by examiner

WIRELESS POWER TRANSMITTER, WIRELESS POWER RECEIVER, AND METHOD OF WIRELESSLY RECEIVING POWER

CROSS-REFERENCE TO RELATED APPLICATION

This application claims the benefit under 35 U.S.C. §119 of Korean Patent Application No. 10-2012-0022237, filed Mar. 5, 2012, which is hereby incorporated by reference in its entirety.

BACKGROUND

The disclosure relates to a wireless power transmitter, a wireless power receiver, and a method of wirelessly receiving power.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Until now, wireless energy transmission schemes include a remote telecommunication technology based on resonance or a short wave radio frequency in addition to electromagnetic induction.

Recently, among wireless power transmitting technologies, an energy transmitting scheme employing resonance has been widely used.

In a wireless power transmission system employing resonance, since an electrical signal generated between the wireless power transmitter and the wireless power receiver is wirelessly transferred through coils, a user may easily charge electronic appliances such as a portable device.

In addition, the wireless power transmitter may receive information of a state of the wireless power receiver to transmit power. If the wireless power receiver includes an additional communication channel or an additional communication unit in order to transmit data to the wireless power transmitter, the high cost is required. Accordingly, the wireless power receiver mainly employs a load modulation scheme to transmit the data. According to the load modulation scheme, the wireless power receiver recognizes the change of an input impedance of the wireless power transmitter by changing the load (impedance) of the wireless power receiver.

However, the conventional load modulation scheme is limited to a magnetic induction type wireless power transmission system.

BRIEF SUMMARY

The disclosure provides a wireless power transmitter based on resonance capable of recognizing the information of a wireless power receiver by detecting input current, the wireless power receiver, and a method of receiving power.

The disclosure provides a wireless power transmitter based on resonance capable of recognizing the information of a wireless power receiver by detecting input current output from a power source and comparing with the detected input current, the wireless power receiver, and a method of receiving power.

According to the embodiment, there is provided a wireless power receiver wirelessly receiving power from a wireless power transmitter. The wireless power receiver includes a receiving unit receiving the power from the wireless power transmitter using resonance, and a rectifying unit rectifying the power received therein from the receiving unit to supply the power to a load side. The rectifying unit changes an output impedance of the wireless power receiver in order to change an input current of the wireless power transmitter.

According to another embodiment, there is provided a wireless power transmitter wirelessly transmitting power to a wireless power receiver. The wireless power transmitter includes a transmission unit transmitting power, which is supplied from a power source, to the wireless power receiver using resonance, and a detecting unit detecting input current of the wireless power transmitter to detect a change of an output impedance of the wireless power receiver by using the detected input current.

According to still another embodiment, there is provided a method of receiving power of a wireless power receiver for wirelessly receiving the power from a wireless power transmitter. The method includes determining state information of the wireless power receiver to be transmitted to the wireless power transmitter, changing an output impedance of the wireless power receiver according to the determined state information, and receiving changed power from the wireless power transmitter according to the changed output impedance.

As described above, according to the embodiment, the change of the output impedance of the wireless power receiver is detected through the input current of the wireless power transmitter to detect the information of the wireless power receiver, so that the power can be effectively transmitted.

According to the embodiment, the wireless power receiver transmits the state information of the wireless power receiver to the wireless power transmitter by changing the output impedance, so that the wireless power receiver can receive power suitable for the state information thereof.

Meanwhile, any other various effects will be directly and implicitly described below in the description of the embodiment.

DETAILED DESCRIPTION

Hereinafter, the embodiments will be described with reference to accompanying drawings in detail so that those skilled in the art can easily realize the embodiments.

Figure 1:
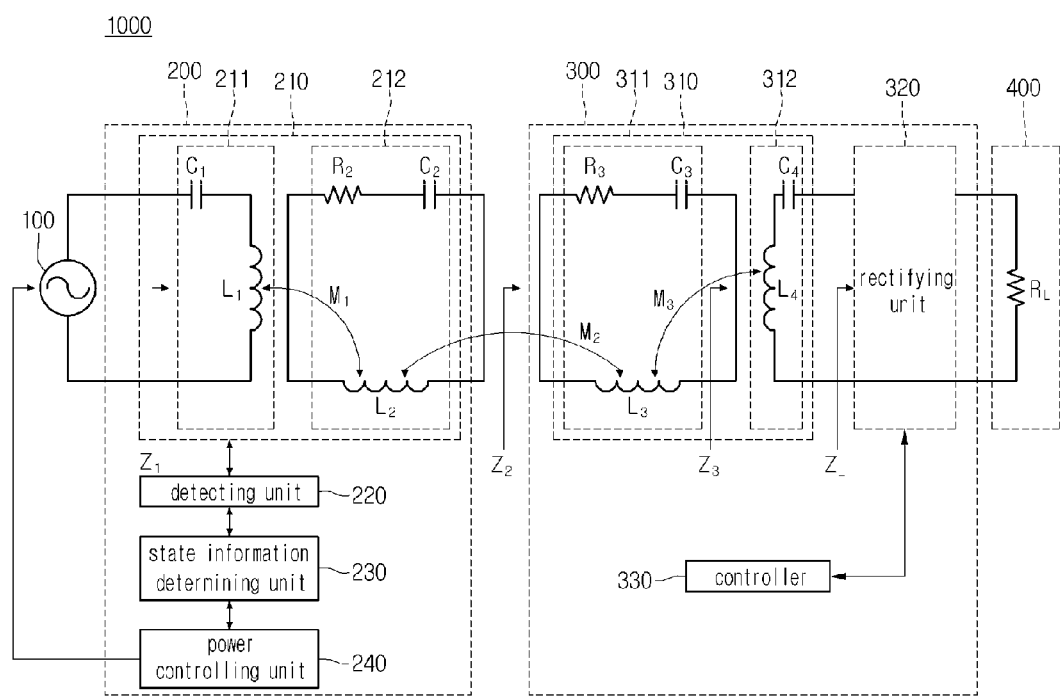
FIG. 1 a circuit diagram showing a wireless power transmission system according to the embodiment.

FIG. 1 a circuit diagram showing a resonance-type wireless power transmission system 1000 according to the embodiment.

Referring to FIG. 1, the wireless power transmission system 1000 may include a power source 100, a wireless power transmitter 200, a wireless power receiver 300 and a load side 400.

The wireless power transmitter 200 may include a transmitting unit 210, a detecting unit 220, a state information determining unit 230 and a power controlling unit 240.

The transmitting unit 210 may includes a transmission induction coil unit 211 and a transmission resonance coil unit 212.

The power generated from the power source 100 is transmitted to the wireless power transmitter 200, and transmitted to the wireless power receiver 300 that makes resonance with the wireless power transmitter 200 through a resonance. The power received by the wireless power receiver 300 is transferred to the load side 400 through a rectifying unit 320. The load side 400 may be a predetermined rechargeable battery or other devices requiring the power. According to the embodiment, a load resistor of the load side 400 is marked as reference sign $R_L$. According to the embodiment, the load side 400 may be included in the wireless power receiver 300.

The power source 100 is an AC power source for supplying an AC power having a predetermined frequency.

The transmitting unit 210 may includes the transmission induction coil unit 211 and the transmission resonance coil unit 212.

The transmission induction coil unit 211 is connected to the power source 100, and AC current flows therethrough by the power received therein from the power source 100. When the AC current flows through the transmission induction coil unit 211, AC current is induced to the transmission resonance coil unit 212 physically spaced apart from the transmission induction coil unit 211 through an electromagnetic induction so that the AC current flows through the transmission resonance coil unit 212. The power received by the transmission resonance coil 212 is transmitted to the wireless power receiver 300, which forms a resonance circuit with the wireless power transmitter 200, using resonance.

Power may be transmitted between two LC circuits, which are impedance-matched with each other, using resonance. The power transmitted by the resonance can be farther transmitted with higher efficiency when comparing with the power transmitted by the electromagnetic induction.

The transmission induction coil unit 211 includes a transmission induction coil $L_1$ and a capacitor $C_1$. In this case, the capacitance of the capacitor $C_1$ is an adjusted value so that the capacitor $C_1$ makes resonance at a resonance frequency ω.

One terminal of the capacitor $C_1$ is connected to one terminal of the power source 100, and the other terminal of the capacitor $C_1$ is connected to one terminal of the transmission induction coil $L_1$. The other terminal of the transmission induction coil $L_1$ is connected to the other terminal of the power source 100.

The transmission resonance coil unit 212 includes a transmission resonance coil $L_2$, a capacitor $C_2$, and a resistor $R_2$. The transmission resonance coil $L_2$ includes one terminal connected to one terminal of the capacitor $C_2$ and the other terminal connected to one terminal of the resistor $R_2$. The other terminal of the resistor R2 is connected to the other terminal of the capacitor $C_2$. The resistance of the resistor R represents the quantity of power lost in the transmission resonance coil L2. In this case, the capacitance of the capacitor $C_2$ is an adjusted value so that the capacitor $C_2$ makes resonance at a resonance frequency ω.

The detecting unit 220 may measure a first input impedance $Z_1$. According to one embodiment, the first input impedance $Z_1$ is obtained when seen from the power source 100 toward the wireless power transmitter 200.

According to the embodiment, the detecting unit 220 may detect the first input impedance $Z_1$ by detecting current input to the wireless power transmitter 200. In detail, on the assumption that voltage input to the wireless power transmitter 200 is constant, the detecting unit 220 may detect the first input impedance $Z_1$ by an equation, Z=V/I, used to find an impedance after detecting the current input to the wireless power transmitter 200.

The detecting unit 220 may detect the average current input to the wireless power transmitter 200, and the average input current may refer to an average value of the current input to the wireless power transmitter 200 during one cycle. The average input current may be varied by the rectifying unit 320 of the wireless power receiver 300 which will be described later.

The detecting unit 220 may detect the change of the output impedance of the wireless power receiver 300 by using the measured average input current.

The state information determining unit 230 determines the state information of the wireless power receiver 300 based on the change of the output impedance. According to one embodiment, the state information of the wireless power receiver 300 may include the information of the present quantity of power charged in the wireless power receiver 300 or the information of the quantity of power corresponding to the variation in the quantity of power charged in the wireless power receiver 300. According to one embodiment, the state information of the wireless power receiver 300 may include power charge completion information representing that the wireless power receiver 300 has been completely charged with power.

The power controlling unit 240 controls power to be transmitted to the wireless power receiver 300 according to the state information of the wireless power receiver 300.

The power controlling unit 240 controls the power source 100 so the power to be transmitted to the wireless power transmitter 200 can be controlled. Accordingly, the power to be transmitted to the wireless power receiver 300 can be controlled.

Accordingly, the procedure of detecting the average input current output by the power source 100 may refer to the procedure in which the wireless power transmitter 200 determines the state of the wireless power receiver 300. In other words, the wireless power receiver 300 transmits the state information thereof to the wireless power transmitter 200, and the wireless power transmitter 200 can transmit desirable power to the wireless power receiver 300 by using the state information of the wireless power receiver 300.

The wireless power transmitter 200 detects the information of the present quantity of power charged in the wireless power receiver 300 based on the average input current output from the power source 100 to transmit power corresponding to the above information.

The wireless power receiver 300 may include a receiving unit 310 and the rectifying unit 320.

The wireless power receiver 300 may be embedded in an electronic device such as a cellular phone, a mouse, a laptop computer, and an MP3 player.

The receiving unit 310 includes a reception resonance coil unit 311 and a reception induction coil unit 312.

The reception resonance coil unit 311 includes a reception resonance coil $L_3$, a capacitor $C_3$, and a resistor $R_3$. The reception resonance coil $L_3$ includes one terminal connected to one terminal of the capacitor $C_3$ and the other terminal connected to one terminal of the resistor $R_3$. The other terminal of the resistor $R_3$ is connected to the other terminal of the capacitor $C_2$. The resistance of the resistor $R_3$ represents the quantity of power lost in the reception resonance coil L3. In this case, the capacitance of the capacitor $C_3$ is adjusted by a controller 330 so that the capacitor $C_3$ makes resonance at a resonance frequency w.

The reception induction coil unit 312 may include a reception induction coil $L_4$ and a capacitor $C_4$. One terminal of the reception induction coil $L_4$ is connected to one terminal of the capacitor $C_4$, and the other terminal of the reception induction coil $L_4$ is connected to the other terminal of the rectifying unit 320. The other terminal of the capacitor $C_4$ is connected to one terminal of the rectifying unit 320. The capacitance of the capacitor $C_4$ is adjusted by the controller 330 so that the capacitor $C_4$ makes resonance at a resonance frequency w.

The reception resonance coil unit 311 maintains the resonance state with the transmission resonance coil unit 212 at the resonance frequency. In other words, the reception resonance coil unit 311 is coupled with the transmission resonance coil unit 212 such that an AC current flows through the reception resonance coil unit 311, and the wireless power receiver 300 may receive power from the wireless power transmitter 200 in a non-radiative scheme.

The reception induction coil unit 312 receives power from the reception resonance coil unit 311 by electromagnetic induction, and the power received by the reception induction coil unit 312 is transmitted to the load side 400 after the power is rectified by the rectifier circuit 320.

The rectifying unit 320 receives the AC power from the reception induction coil unit 312 and rectifies the received AC power so that the AC power is converted into DC power.

The rectifying unit 320 may vary the output impedance $Z_L$ obtained when seen from the reception induction coil unit 312 toward the load side 400. According to one embodiment, the output impedance $Z_L$ may refer to the impedance obtained when seen from the reception induction coil unit 312 toward the rectifying unit 320.

The rectifying unit 320 varies the output impedance $Z_L$ through the open or the short of the switch SW, so that the first input impedance $Z_1$ can be changed. Hereinafter, the change of the average input current output by the power source 100 according to the first input impedance $Z_1$ changed by the rectifying unit 320 will be described.

The third input impedance $Z_3$ may refer to an impedance measured when the load side 400 is seen from the reception resonance coil $L_3$ and may be expressed by Equation 1:

$$Z_3 = \frac{\omega^3 M_3^2}{Z_L + j\omega L_4 + \frac{1}{j\omega C_4}} \qquad \text{Equation 1}$$

In this case, ω denotes a resonance frequency when the transmission resonance coil $L_2$ makes resonance with the reception resonance coil $L_3$, and $M_3$ denotes is a mutual inductance between the reception resonance coil $L_3$ and the reception induction coil $L_4$. Further, $Z_L$ denotes output impedance.

Equation 1 is an equation based on a frequency domain, and even following equations are expressed based on the frequency domain.

The second input impedance $Z_2$ means an impedance measured when the wireless power receiver 300 is seen from the wireless power transmitter 200, and may be expressed as Equation 2:

$$Z_2 = \frac{j\omega^2 C_3 M_2^2}{1 - \omega^2 L_3 C_3 + j\omega C_3 (Z_3 + R_3)} \qquad \text{Equation 2}$$

In this case, $M_2$ denotes a mutual inductance between the transmission resonance coil $L_2$ and the reception resonance coil L3, and C3 denotes a capacitor expressed when the reception resonance coil unit 311 is transformed to equivalent circuit. In addition, the resistance of the resistor R3 represents the quantity of power lost in the reception resonance coil 13.

While the capacitor $C_3$ and the leakage resistor $R_3$ may have fixed values, the mutual inductance $M_2$ may be varied with a coupling coefficient $K_2$ between the transmission resonance coil $L_2$ and the reception resonance coil $L_3$.

The coupling coefficient $K_2$ represents a degree of the electromagnetic couple between the transmission resonance coil $L_2$ and the reception resonance coil $L_3$, and may be varied by at least one of a distance, a direction and a position between the wireless power transmitter 200 and the wireless power receiver 300 in the wireless power system 1000.

The first input impedance Z1 is an impedance measured when seen the wireless power transmitter 200 from the power source 100 and may be expressed as Equation 3:

$$Z_1 = j\omega L_1 + \frac{1}{j\omega C_1} + \frac{j\omega^3 C_2 M_1^2}{1 - \omega^2 L_2 C_2 + j\omega C_2 (Z_2 + R_2)} \qquad \text{Equation 3}$$

In this case, $M_1$ represents a mutual inductance between the transmission induction coil $L_1$ and the transmission resonance coil $L_2$.

On the assumption that R1 and R2 have very small values in Equations 1 to 3, $R_1$ and $R_2$ may become '0'(zero). In addition, if a resonance frequency ω is determined such that resonances between the transmission induction coil $L_1$ and the capacitor $C_1$, between the transmission resonance coil $L_2$ and the capacitor $C_2$, and between the reception resonance coil $L_3$ and the capacitor $C_3$ occur at the resonance frequency ω, the first input impedance $Z_1$ may be expressed as Equation 4.

$$Z_1 = \frac{M_1^2 M_3^2}{M_2^2} \frac{\omega^2}{Z_L} \qquad \text{Equation 4}$$

Further, if following Equation 5 to Equation 7, which represent the relation between mutual inductances and coupling coefficients, are applied to Equation 4, Equation 4 may be expressed as Equation 8.

$$M_1 = k_1 \sqrt{L_1 L_2} \qquad \text{Equation 5}$$

In this case, a coupling coefficient K1 refers to the degree of the electromagnetic coupling between the transmission induction coil $L_1$ and the transmission resonance coil $L_2$, and $M_1$ refers to the mutual inductance between the transmission induction coil $L_1$ and the transmission resonance coil $L_2$.

$$M_2 = K_2 \sqrt{L_2 L_3} \qquad \text{Equation 6}$$

In Equation 6, a coupling coefficient K2 refers to the degree of the electromagnetic coupling between the transmission resonance coil $L_2$ and the reception resonance coil $L_3$, and $M_2$ refers to the mutual inductance between the transmission resonance coil $L_2$ and the reception resonance coil $L_3$.

$$M_3 = K_3 \sqrt{L_3 L_4} \qquad \text{Equation 7}$$

In Equation 7, a coupling coefficient $K_3$ refers to the degree of the electromagnetic coupling between the reception resonance coil $L_3$ and the reception induction coil $L_4$, and $M_3$ refers to the mutual inductance between the reception resonance coil $L_3$ and the reception induction coil L4.

$$Z_1 = \frac{k_1^2 k_3^2}{k_2^2} \frac{\omega^2 L_1 L_4}{Z_L} \quad \text{Equation 8}$$

As a result, regarding Equation 8, the first input impedance $Z_1$ may be changed as the output impedance $Z_L$ is changed. Since the input current, which is output from the power source 100, may be expressed as the ratio of input voltage to the first input impedance $Z_1$, the input current may be changed as the first input impedance $Z_1$ is changed. The details thereof will be more described with reference to FIGS. 2 to 4.

The controller 330 may control the rectifying unit 320 by applying a control signal to the rectifying unit 320. The control signal may be used to open or short the switch SW.

Hereinafter, the change of the output impedance $Z_L$ and the first input impedance $Z_1$ according to the open or the short of the switch SW will be described with reference to FIGS. 2 to 3. In this case, the load modulation is performed through the change of the first input impedance $Z_1$.

Figure 2:
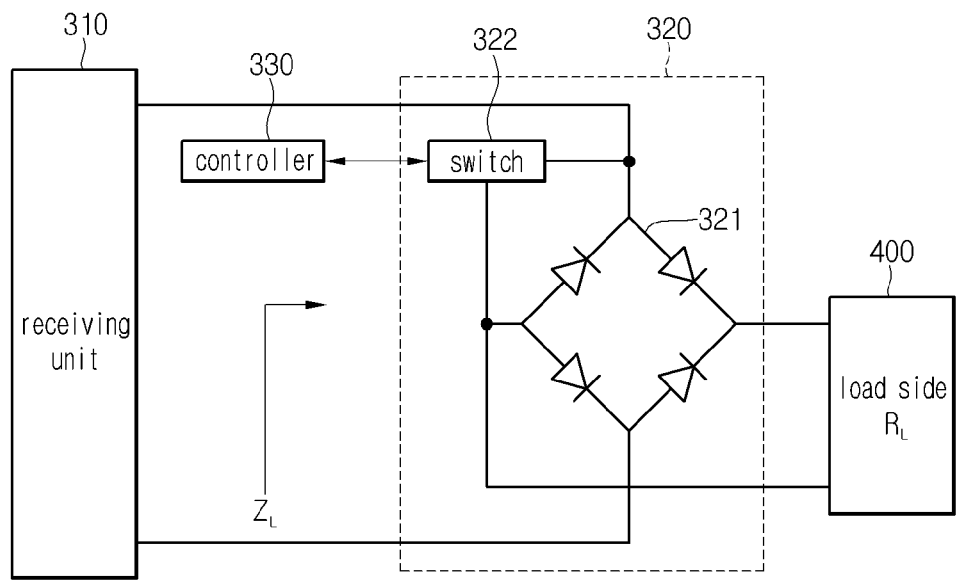
FIG. 2 is a view showing the structure of a rectifying unit according to one embodiment.

FIG. 2 is a view showing the structure of the rectifying unit 320 according to one embodiment.

Referring to FIG. 2, the rectifying unit 320 includes a bridge diode 321 and a switch 322.

The rectifying unit 320 may rectify AC power, which is received therein from the receiving unit 310, to DC power to be transmitted to the load side 400.

The bridge diode 321 has a structure in which four diodes are connected to each other. The bridge diode 321 rectifies AC current to be transmitted to the load side 400 into DC current so that the DC current may be transmitted to the load side 400.

The switch 322 is opened or shorted depending on the control signal of the controller 330 to change the flow of current to be transmitted to the load side 400.

Hereinafter, the change of the first input impedance $Z_1$ according to the change of the output impedance $Z_1$ in the open state or the short state of the switch 322 will be described.

Figure 3:
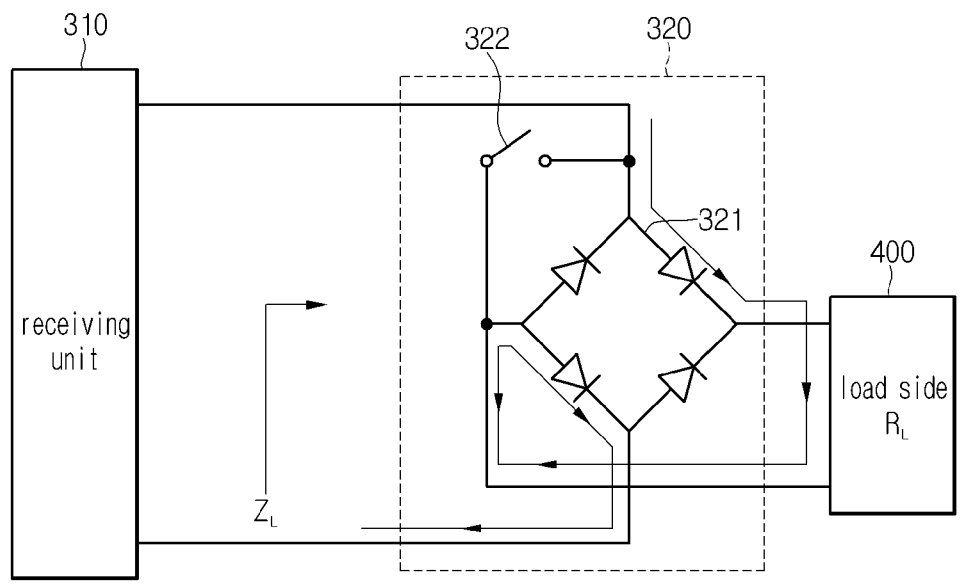
FIG. 3 is a view showing the open state of the switch of the rectifying unit 320 according to one embodiment.

FIG. 3 is a view showing the open state of the switch 322 of the rectifying unit 320 according to one embodiment.

Referring to FIG. 3, if the switch 322 is opened by the control signal of the controller 330, the rectifying unit 320 may be expressed as a circuit shown in FIG. 3.

If the switch 322 is opened, the output impedance $Z_L$ may be expressed as Equation 9. In other words, if the switch 322 is opened, the bridge diode 321 may change the flow of current input from the receiving unit 310 to the bridge diode 321. In detail, if the switch 322 is opened, the current flows along the arrow shown in FIG. 3.

In this case, the output impedance $Z_L$ may be expressed as Equation 9.

$$Z_L = R_L \quad \text{Equation 9}$$

The first input impedance $Z_1$ may be expressed as Equation 10 by substituting Equation 9 into Equation 8.

$$Z_1 = \frac{k_1^2 k_3^2}{k_2^2} \frac{\omega^2 L_1 L_4}{R_L} \quad \text{Equation 10}$$

Figure 4:
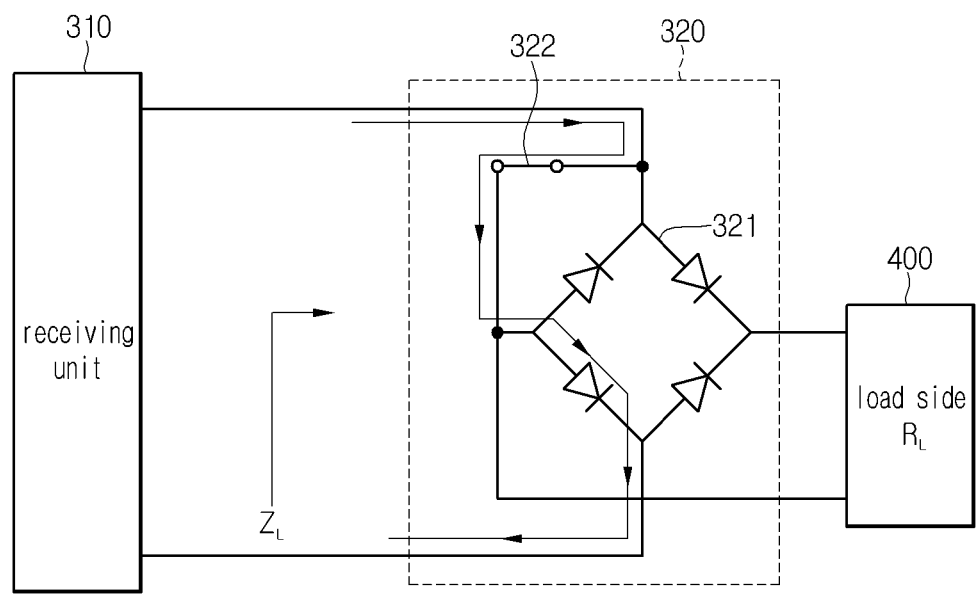
FIG. 4 is a view showing the short state of the switch of the rectifying unit 320 according to one embodiment.

FIG. 4 is a view showing the short state of the switch 322 of the rectifying unit 320 according to one embodiment.

Referring to FIG. 4, if the switch 322 is shorted by the control signal of the controller 330, the rectifying unit 320 may be expressed as a circuit shown in FIG. 4.

If the switch 322 is shorted, current may flow along the arrow shown in FIG. 4, and the output impedance ZL may be expressed as Equation 11.

$$Z_L = 0 \quad \text{Equation 11}$$

In other words, during one cycle in which the switch 322 is shorted, the output impedance ZL may be expressed as Equation 11. In addition, during one cycle in which the switch 322 is opened, the output impedance $Z_L$ may be expressed as Equation 9. In other words, if the switch 322 is shorted, the bridge diode 321 changes the flow of current input from the receiving unit 310 to the bridge diode 321, so that the output impedance $Z_L$ during one cycle may be expressed as Equation 11. If the switch 322 is opened, the bridge diode 321 changes the flow of the current input therein from the receiving unit 310, so that the output impedance $Z_L$ during another cycle may be expressed as Equation 9.

Accordingly, during one cycle in which the switch 322 is opened, the first input impedance $Z_1$ may be expressed as Equation 10. During another cycle in which the switch 322 is shorted, the first input impedance $Z_1$ may be expressed as Equation 12.

$$Z_1 = \frac{k_1^2 k_3^2}{k_2^2} \frac{\omega^2 L_1 L_4}{0} = \infty \quad \text{Equation 12}$$

The first input impedance $Z_1$ may be obtained as the ratio of input voltage, which is output from the power source 100, to input current. As the switch 322 is opened or shorted as described above, the first input impedance $Z_1$ is varied. As the first input impedance $Z_1$ is varied, the input current output from the power source 100 is varied. In this case, on the assumption that the input voltage output from the power source 100 is previously known, the detecting unit 220 may detect the first input impedance Z1 of the wireless power transmitter 200 by measuring the input current input to the wireless power transmitter 200. In detail, the detecting unit 220 may measure the input current input to the wireless power transmitter 200 in the unit of a cycle, and detect the first input impedance $Z_1$ based on the measured input current.

The detecting unit 220 may detect the change of the output impedance of the wireless power receiver 300 based on the first input impedance $Z_1$.

Accordingly, the open state or the short state of the switch 322 can be recognized by comparing with the average input current output from the power source 100 or the first input impedance Z1 during one cycle. Therefore, the wireless power transmitter 200 may detect the state of the wireless power receiver 300 to transmit desirable power according to the detected state of the wireless power receiver.

For example, when the wireless power receiver 300 transmits digital data of 1 to the wireless power transmitter 200, the controller 330 may short the switch 322. In addition, when the wireless power receiver 300 transmits digital data of 0, the controller 330 may open the switch 322. Naturally, the above description is made only for the illustrative purpose. In other words, when the wireless power receiver 300 transmits digital data of 1 to the wireless power transmitter 200, the controller 330 may open the switch 322. In addition, when the wireless power receiver 300 transmits digital data of 0, the controller 330 may short the switch 322.

The detecting unit 220 may check the short state or the open state of the switch 322 through the detection and the comparison of the average input current of the wireless power transmitter 200 or the first input impedance $Z_1$ so that the state information of the wireless power receiver 300 can be received.

Accordingly, the wireless power transmitter 200 can transmit desirable power by receiving the state information of the wireless power receiver 300.

For example, when the wireless power receiver 300 transmits the power charge completion information, which represents that the wireless power receiver 300 has been completely charged with power, to the wireless power transmitter 200, the wireless power receiver 300 performs a switching operation corresponding to the power charge completion information, and the wireless power transmitter 200 detects the average input current or the first input impedance $Z_1$ to receive the power charge completion information of the wireless power receiver 300. The wireless power transmitter 200 controls the power source 100 according to the received power charge completion information to stop the power transmission to the wireless power receiver 300.

Figure 5:
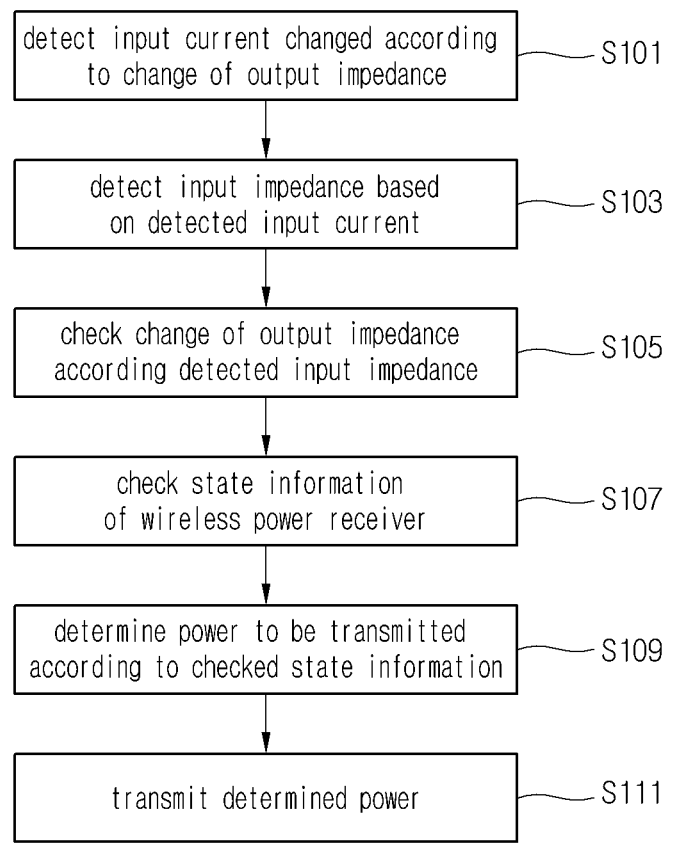
FIG. 5 is a flowchart showing the power transmission of the wireless power transmitter according to one embodiment.

FIG. 5 is a flowchart showing the power transmission of the wireless power transmitter according to one embodiment.

Hereinafter, the power transmission of the wireless power transmitter according to one embodiment will be described with reference to FIGS. 1 to 4.

First, the detecting unit 220 of the wireless power transmitter 200 detects the input current of the wireless power transmitter 200 changed as the output impedance of the wireless power receiver 300 is changed (step S101). The input current may be output from the power source 100 and then input to the wireless power transmitter 200. The detecting unit 220 may detect the input current during one cycle. One cycle may be time in which the switch 322 of the wireless power receiver 300 maintains a short state or an open state.

In other words, the rectifying unit 320 of the wireless power receiver 300 may vary the output impedance $Z_L$. Accordingly, the input current of the wireless power transmitter 200 may be varied. In detail, the controller 330 may vary the output impedance $Z_L$ by transmitting the control signal to the switch 322 of the rectifying unit 320. In other words, the wireless power receiver 300 may vary the output impedance $Z_L$ in order to transmit the state information thereof to the wireless power transmitter 200. The control signal may be a signal to open or short the switch 322. The procedure of varying the output impedance $Z_L$ has been described above with reference to FIGS. 1 to 4.

According to one embodiment, the output impedance $Z_L$ may be impedance measured when seen from the receiving unit 310 to the rectifying unit 320.

Thereafter, the detecting unit 220 of the wireless power transmitter 200 detects the input impedance of the wireless power transmitter 200 based on the input current detected by the detecting unit 220 (step S103). On the assumption that the input voltage of the wireless power transmitter 200 is constant, the detecting unit 220 may detect the input impedance of the wireless power transmitter 200 based on the input current detected through the equation related to the impedance, $Z=V/I$. The input impedance of the wireless power transmitter 200 is the first input impedance described with reference to FIGS. 1 to 4.

The detecting unit 220 of the wireless power transmitter 200 may check the change of the output impedance of the wireless power receiver 300 by using the detected input impedance of the wireless power transmitter 200 (step S105). According to one embodiment, the detecting unit 220 may recognize the change of the output impedance by comparing the input impedance during one present cycle with the input impedance detected during one previous cycle. In other words, the input impedance may be varied in the unit of one cycle according to the switching operation of the wireless power receiver 300, and the detecting unit 220 may check the change of the output impedance based on the input impedance of each cycle.

The state information determining unit 230 of the wireless power transmitter 200 determines the state information of the wireless power receiver 300 based on the checked change of the output impedance (step S107).

In other words, since changing the output impedance is a procedure in which the wireless power receiver 300 transmits the state information of the wireless power receiver 300 to the wireless power transmitter 300, the state information determining unit 230 can check the state information of the wireless power receiver 300 based on the change of the output impedance.

The power controlling unit 240 of the wireless power transmitter 200 can determine the quantity of power to be transmitted to the wireless power receiver 300 according to the checked state information of the wireless power receiver 300, and control the power source 100 to supply the determined quantity of the transmission power to the wireless power receiver 300 (step S109).

The transmitting unit 210 of the wireless power transmitter 200 transmits the determined quantity of the transmission power to the wireless power receiver 300 (step S111).

Figure 6:
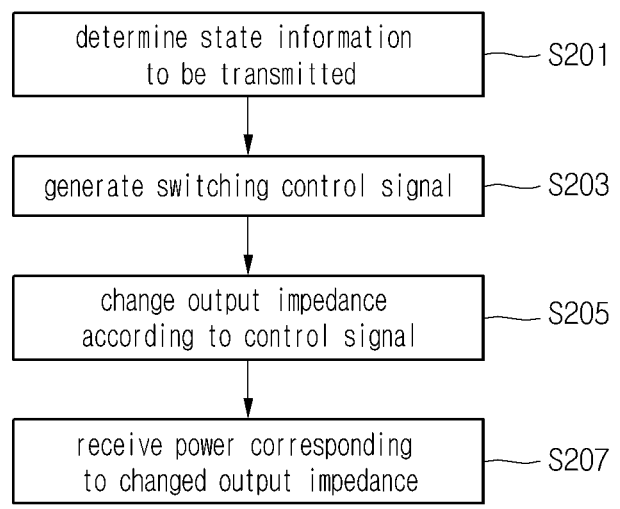
FIG. 6 is a flowchart showing a method of receiving power by the wireless power receiver according to one embodiment.

FIG. 6 is a flowchart showing a method of receiving power by the wireless power receiver according to one embodiment.

Hereinafter, the method of receiving power by the wireless power receiver according to one embodiment will be described based on the description made with reference to FIGS. 1 to 4.

The controller 330 of the wireless power receiver 300 determines the state information of the wireless power receiver 300 to be transmitted to the wireless power transmitter 200 (step S201). In other words, the wireless power receiver 300 may create and determine the state information to be transmitted in order to inform the wireless power transmitter 200 of the present state of the wireless power receiver 300 to be transmitted.

According to one embodiment, the state information of the wireless power receiver 300 may include one of power charge completion information representing that the wireless power receiver 300 has been completely charged with power, the information of the present quantity of power or the quantity of power corresponding to the variation in the quantity of power which is charged in the wireless power receiver 300, and charge state information representing that the wireless power receiver 300 normally receives power.

The controller 330 of the wireless power receiver 300 creates a switching control signal to control the operation of the switch 322 of the rectifying unit 320 according to the determined state information of the wireless power receiver 300 (step S203).

The rectifying unit 320 of the wireless power receiver 300 changes the output impedance of the wireless power receiver 300 according to the created control signal (step S205). The control signal may include a short signal or an open signal to change the output impedance of the wireless power receiver 300. The procedure of changing the output impedance has been described with reference to FIGS. 1 to 4.

According to one embodiment, the output impedance $Z_L$ may represent an impedance measured when seen from the receiving unit 310 of the wireless power receiver 300 to the rectifying unit 320.

The wireless power receiver 300 informs the wireless power transmitter 200 of the state information of the receiving unit 310 and receives power corresponding to the state information (step S205). According to one embodiment, the wireless power receiver 300 may inform the wireless power transmitter 200 of the state information of the wireless power receiver 300 by changing the output impedance so that the transmission power is increased, and the receiving unit 310 may receive the increased power.

According to one embodiment, the wireless power receiver 300 may inform the wireless power transmitter 200 of the state information of the wireless power receiver 300 representing that power changing is completed by changing the output impedance, and the receiving unit 310 may not receive power from the wireless power transmitter 200.

A power transmission method and a power reception method according to the disclosure may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver wirelessly receiving power from a wireless power transmitter, the wireless power receiver comprising:
a receiving unit receiving the power from the wireless power transmitter using resonance; and
a rectifying unit rectifying the power received therein from the receiving unit to supply the power to a load side,
wherein the rectifying unit changes an output impedance of the wireless power receiver in order to change an input current of the wireless power transmitter,
wherein the rectifying unit comprises:
a bridge diode comprising four diodes connected to each other; and
a switch changing a flow of current inputted from the receiving unit to the bridge diode,
wherein the bridge diode changes the output impedance as the toy of current is changed.

2. The wireless power receiver of claim 1, wherein the switch is opened or shorted in order to change the flow of current.

3. The wireless power receiver of claim 2, wherein the output impedance is an impedance measured when seen from the receiving unit to the rectifying unit.

4. The wireless power receiver of claim 1, wherein the output impedance is an impedance measured when seen from the receiving unit to the rectifying unit.

5. The wireless power receiver of claim 1, wherein the rectifying unit informs the wireless power transmitter of state information of the wireless power receiver as the input current of the wireless power transmitter is changed by changing the output impedance.

6. The wireless power receiver of claim 5, wherein the state information of the wireless power receiver includes one of power charge completion information of the wireless power receiver and a quantity of power charged in the wireless power receiver.

7. The wireless power receiver of claim 1, wherein the receiving unit comprises:
a reception resonance coil resonance-coupled with a transmission resonance coil of the wireless power transmitter to receive the power; and
a reception induction coil coupled with the reception resonance coil to receive the power.

8. A wireless power transmitter wirelessly transmitting power to a wireless power receiver, the wireless power transmitter comprises:
a transmission unit transmitting power, which is supplied from a power source, to the wireless power receiver using resonance; and
a detecting unit detecting input current of the wireless power transmitter to detect a change of an output impedance of the wireless power receiver by using the detected input current,
wherein the wireless power receiver changes the output impedance in order to change the input current,
wherein the wireless power receiver comprises:
a bridge diode comprising four diodes connected to each other; and
a switch changing a flow of current inputted to the bridge diode,
wherein the bridge diode changes the output impedance as the flow of current inputted to the bridge diode is changed.

9. The wireless power transmitter of claim 8, wherein the input impedance is an impedance measured when seen from the power source toward the wireless power transmitter.

10. The wireless power transmitter of claim 8, wherein the detecting unit detects the change of the output impedance of the wireless power receiver by detecting an average input current of the wireless power receiver during one cycle.

11. The wireless power transmitter of claim 8, wherein the transmission unit comprises:
a transmission induction coil receiving the power from the power source; and
a transmission resonance coil coupled with the transmission induction coil to transmit the received power to the wireless power receiver using resonance.

12. The wireless power transmitter of claim 8, further comprising a state information determining unit to determine state information of the wireless power receiver based on the detected change of the output impedance.

13. The wireless power transmitter of claim 12, further comprising a power controlling unit to control the power to be transmitted to the wireless power receiver according to the determined state information.

14. The wireless power receiver of claim 8, wherein the output impedance is an impedance measured when seen from a receiving unit of the wireless power receiver to a rectifying unit including the bridge diode and the switch.

15. A method of receiving power of a wireless power receiver for wirelessly receiving the power from a wireless power transmitter, the method comprising:

determining state information of the wireless power receiver to be transmitted to the wireless power transmitter;

changing an output impedance of the wireless power receiver according to the determined state information; and receiving changed power from the wireless power transmitter according to the changed output impedance, wherein the wireless power receiver comprises:

a bride diode comprising four diodes connected to each other; and a switch changing a flow of current inputted to the bridge diode, wherein the bridge diode changes the output impedance as the flow of current inputted to the bridge diode is changed.

16. The method of claim 15, wherein the switch is opened or shorted in order to change the flow of current inputted to the bridge diode.

17. The method of claim 15, wherein the receiving of the changed power from the wireless power transmitter according to the changed output impedance comprises:

changing an input current of the wireless power transmitter as the output impedance is changed and receiving the changed power from the wireless power transmitter based on the changed input current.

18. The method of claim 15, wherein the state information of the wireless power receiver includes one of power charge completion information of the wireless power receiver and a quantity of power charged in the wireless power receiver.

19. The method of claim 15, wherein the output impedance of the wireless power receiver is an impedance measured when seen from a receiving unit provided in the wireless power receiver toward a rectifying unit including the bridge diode and the switch.

20. A recording medium recording a program for executing the method for receiving a power of the wireless power receiver claimed claim 15.

* * * * *